May 3, 1932. C. F. SHERWOOD 1,856,661
METHOD OF MAKING COPPER POWDER
Filed June 2, 1927

Inventor
Charles F. Sherwood
By Spencer Hardman & Fehr
his Attorneys

Patented May 3, 1932

1,856,661

UNITED STATES PATENT OFFICE

CHARLES FREDERIC SHERWOOD, OF DETROIT, MICHIGAN, ASSIGNOR TO THE MORAINE PRODUCTS COMPANY, OF DAYTON, OHIO, A CORPORATION OF OHIO

METHOD OF MAKING COPPER POWDER

Application filed June 2, 1927. Serial No. 195,968.

This invention relates to the manufacture of finely divided copper or copper powder, particularly, copper powder used in the manufacture of articles, such as bearings, and dynamo brushes and other devices having rubbing engagement with a relatively movable part, from finely divided substances including metallic ingredients.

One object of the invention is to manufacture copper powder by a process which results in powder practically free of oxide.

Another object of this invention is to make copper powder, suitable for the articles mentioned, from the waste of copper refineries or the scrap copper from factories making copper articles, especially from sheet copper.

As applied to scrap copper my improved process comprises, chiefly, the formation of copper sulphate by dissolving pieces of copper in dilute sulphuric acid, the precipitation of finely divided copper by agitating the copper sulphate solution with pieces of iron, drying the copper in such a manner as to minimize oxidation during drying, and the treatment of the dried copper powder to change its specific gravity from normal to that required for manufacture into articles such as those mentioned.

Copper mud, as obtained from copper refineries, contains foreign matter which can be removed by an ore concentration table, and other impurities, such as iron sulphate which can be eliminated by a suitable chemical process. The copper powder obtained from the copper mud is dried and treated for specific gravity modification in the same manner as for copper powder obtained by precipitation from copper sulphate solution.

Further objects and advantages of the present invention will be apparent from the following description, reference being had to the accompanying drawings, wherein a preferred form of embodiment of the present invention is clearly shown.

Figure 1:
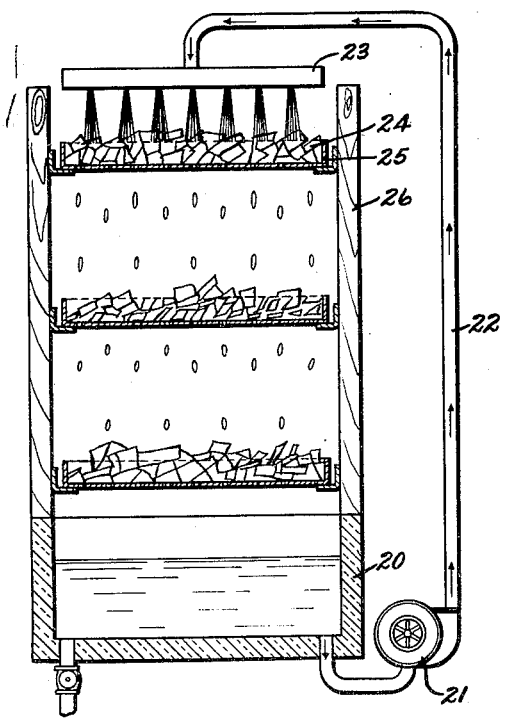
Fig. 1 is a diagrammatic vertical sectional view of apparatus for forming copper sulphate solution from copper scrap.
Figure 2:
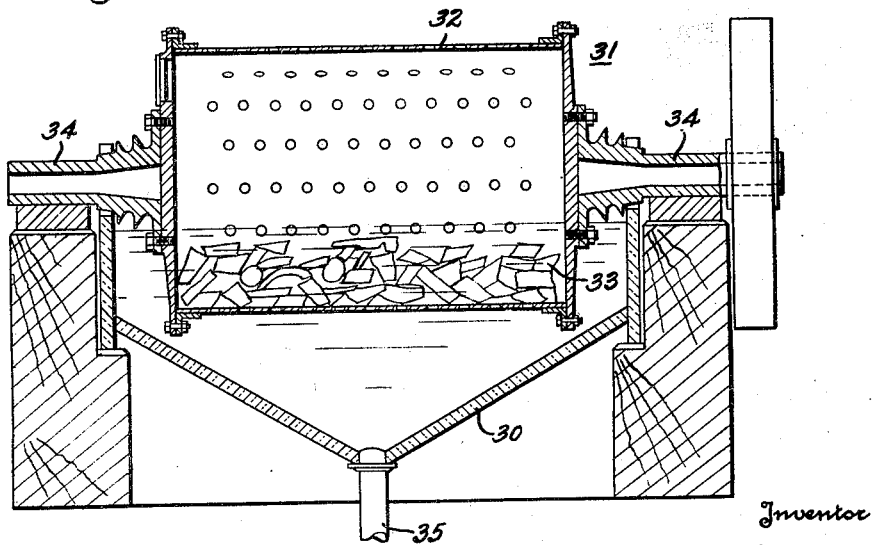
Fig. 2 is a diagrammatic longitudinal sectional view of apparatus for precipitating copper powder from copper sulphate.

Referring to Fig. 1, 20 is a vessel made of glass, hard rubber, or other suitable acid resisting material for containing the acid solution, which is preferably a 10% solution of sulphuric acid. The acid solution is kept in circulation by a pump 21 which delivers it through a pipe 22 to a manifold 23 from which it drips upon pieces of copper 24 contained in superposed trays 25, having perforated bottoms. These trays are open to atmosphere and are supported by posts 26. As copper oxide is formed on the surface of the copper pieces it is attacked by the acid solution to form copper sulphate. When the solution circulated by the pump contains a sufficient amount of copper sulphate, as determined by its specific gravity, it is passed into a vessel 30 of the same material as the vessel 20, shown in Fig. 2, in which revolves a drum 31 having a perforated cylindrical wall 32 and containing pieces of iron 33. As iron changes places with copper in the copper sulphate solution, the copper coats the iron but is shaken loose by the agitation of the iron pieces when the drum is rotated upon its trunnions 34. For a drum which is four feet in diameter, the speed of rotation should be about 20 R. P. M. in order that the copper particles will be rubbed or shaken off the iron pieces as soon as these particles are formed. The copper must be removed from the iron pieces in order that the surfaces of the iron pieces may be kept in condition for action upon the solution containing copper sulphate. When this solution tests practically free of copper sulphate the wet copper powder which has collected at the bottom of the vessel 30 is withdrawn through the pipe 35, and the solution remaining is discarded.

The wet copper powder is washed and then dried preferably in a centrifugal drier. When about dry the powder is wet with alcohol or benzine, which is present in the drier in the form of mist, in order to facilitate drying without substantial oxidation of the powder.

Figure 3:
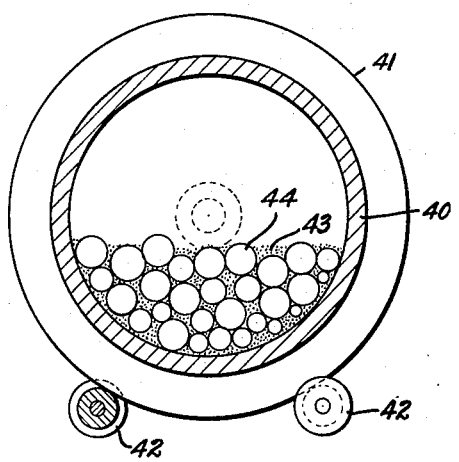
Fig. 3 is a diagrammatic transverse sectional view of apparatus for treating dried copper powder to modify its specific gravity.

The copper powder obtained by this process is relatively low in specific gravity, namely about 1.43 grams per cubic centimeter in its natural dry state. For use in manufacturing bearings by sintering briquetted powder mixtures of metal powders and other substances the practice has been to use copper powder weighing about 2.5 grams per cubic centimeter. I have discovered that the specific gravity of the copper powder formed in the manner described can be increased by treating it in a ball mill shown diagrammatically in Fig. 3. The mill comprises an iron cylinder 40 having a circular flange 41 at each end supported by trunnions 42. As the cylinder 40 rotates, the balls 44 attempt to follow that part of the inner surface of the cylinder which moves upwardly, and they eventually fall upon the powder 43 with sufficient force to render the powder grains less porous or fluffy and more compact. A ball mill having a ten inch cylinder should be rotated at about 50 R. P. M. for best results.

The ball-milling of the copper powder to increase its specific gravity may take place simultaneously with the mixing of it with other ingredients, for example tin powder, a filler such as graphite and a void forming substance such as salicylic acid.

The same drying and ball-milling process may be applied to copper powder obtained by purifying the copper mud obtained from the waste of copper refineries.

One of the advantages derived from the present invention is that the copper powder can be kept practically free of oxidation before mixing with other ingredients. The powder may be stored under water or other suitable liquid to keep it out of contact with air, and dried as used. By using copper powder which is practically free of oxide in the manufacture of articles by sintering a briquetted mixture of powdered substances, greater ductility and machineability can be obtained than heretofore possible when using copper powder containing an appreciable amount of copper oxide. These properties are believed to be due to elimination of very hard spots which tend to decrease ductility and to dull cutting tools.

While the form of embodiment of the present invention as herein disclosed, constitutes a preferred form, it is to be understood that other forms might be adopted, all coming within the scope of the claim which follows.

What is claimed is as follows:

The method of making a mixture of ingredients for the manufacture of porous metal bodies which consists in precipitating, with the use of iron, copper particles from a solution of copper sulphate, in washing and drying the copper particles, in compacting the copper particles to increase their specific gravity and in mixing them with other ingredients such as a finely divided metal alloyable with copper, and a void forming substance.

In testimony whereof I hereto affix my signature.

CHARLES FREDERIC SHERWOOD.